United States Patent [19]
Paju

[11] Patent Number: 5,787,844
[45] Date of Patent: Aug. 4, 1998

[54] ECONOMIZER SYSTEM

[75] Inventor: Raimo Paju, Varkaus, Finland

[73] Assignee: Ahlstrom Machinery Oy, Helsinki, Finland

[21] Appl. No.: 609,041

[22] Filed: Feb. 29, 1996

[30] Foreign Application Priority Data

Mar. 6, 1995 [FI] Finland ................... 951014

[51] Int. Cl.$^6$ .................. F22D 1/28; F22G 1/04
[52] U.S. Cl. .................. 122/7 C; 122/379; 122/470
[58] Field of Search .................. 122/7 C, 7 R, 122/470, 379, 392, 477

[56] References Cited

U.S. PATENT DOCUMENTS

| | | | |
|---|---|---|---|
| 2,620,780 | 12/1952 | Marquez, Jr. ............... | 122/7 R |
| 2,702,235 | 2/1955 | Hochmuth . | |
| 2,936,215 | 5/1960 | Hochmuth . | |
| 3,169,512 | 2/1965 | Hochmuth ............... | 122/7 R |
| 3,625,186 | 12/1971 | Herbst ............... | 122/7 C |
| 3,915,654 | 10/1975 | Oni et al. ............... | 122/7 C |
| 4,442,800 | 4/1984 | Seifert et al. ............... | 122/379 |
| 5,299,534 | 4/1994 | Janka ............... | 122/470 |

FOREIGN PATENT DOCUMENTS

3126/72  11/1972  Finland .

*Primary Examiner*—Henry A. Bennett
*Assistant Examiner*—Gregory Wilson
*Attorney, Agent, or Firm*—Nixon & Vanderhye P.C.

[57] ABSTRACT

An otherwise conventional recovery boiler for burning black liquor (e.g. with a consistency of between about 70–90%) requires less capital investment and takes up less space by constructing the economizers in a particular manner. At least first and second economizers are provided for preheating feed water utilizing flue gas from combustion of the black liquor. The economizers are positioned substantially adjacent each other and connected in such a way that flue gas leaving the first economizer passes substantially directly (i.e. without going through a conventional accessory passage) into the second economizer. The economizer inlets and outlets are substantially at the same level as the adjacent economizer outlets and inlets, or vertically spaced less than about one-third the length of the previous economizer. A boiler bank may be connected between the superheater section of the recovery boiler and the first economizer, and any number of economizers can be utilized. The flue gas flowing through one economizer are turned after exiting so that it flows in a substantially opposite direction while passing through the adjacent economizer.

19 Claims, 4 Drawing Sheets

ECONOMIZER SYSTEM

BACKGROUND AND SUMMARY OF THE INVENTION

The present invention relates to an apparatus and method for heat recovery of flue gases generated by the burning of waste liquor, e.g. black liquor, in the sulphate cellulose pulp industry, in which feed water in a boiler is heated by economizers.

In the manufacture of chemical pulp, lignin and other organic non-cellulosic substances are separated from the raw material of the chemical pulp by cooking with chemicals. The spent cooking liquor, i.e. the waste liquor, is recovered. The waste liquor that is mechanically separated from chemical pulp has a high thermal value due to the carbonaceous and other organic combustible materials therein. The waste liquor additionally contains inorganic chemicals that did not react during cooking of the chemical pulp. Several different methods have been developed to recover the heat and chemicals of the waste liquor.

The black liquor received from sulphate pulp production is usually burnt in a recovery boiler. As the organic and carbonaceous substances are burning, the inorganic components in the waste liquor turn into chemicals that can be recycled and reutilized in the cooking process.

Hot flue gases are generated during burning of black liquor, which gases are passed into contact with various heat exchangers in the recovery boiler. Flue gases transfer heat into water, steam, or a mixture of water and steam flowing in the heat exchangers, simultaneously cooling during transfer. Flue gases generally contain a great deal of ash. The largest part of the ash is sodium sulfate, and the second largest part is sodium carbonate. In addition, there are other components of the ash. In the furnace of the boiler, the ash passing along with the flue gases is largely in the form of vapor, and is beginning to turn into fine dust and melt drops (primarily in the portions of the system after the furnace). The salts contained in the ash will melt or turn into adhesive particles at a relatively low temperature. The molten and adhesive particles easily stick to heat exchange surfaces and even corrode them. The deposits formed by adhesive ash have resulted in a significant risk of clogging of the flue gas channels, and make heat surfaces in the boiler corrode and deteriorate.

CONVENTIONAL PRIOR ART RECOVERY BOILER

A conventional recovery boiler for combusting waste liquor (e.g. black liquor) typically comprises the following main components that are schematically illustrated in FIG. 1:

- A lower part 1 of the furnace, in which burning of the waste liquor is primarily performed.
- A middle part 2 of the furnace, in which final combustion of the gaseous combustible substances primarily occurs.
- An upper part 3 of the furnace.
- A superheater zone 4, in which the temperature of the saturated vapor coming from a steam drum is raised (the vapor being thus superheated). In the superheater zone 4, or upstream thereof, there is usually a screen boiler surface or screen tube system, which also functions as a water boiler.
- A boiler bank or steam-generating section 5, in which water at a saturated temperature is boiled into vapor.
- Economizers 6a, 6b, in which the feed water flowing in the heat exchange elements is pre-heated prior to the water being passed into a drum 7, the boiler bank 5 and the superheating zone 4.
- A drum (i.e. steam drum) 7, having water in the lower part thereof and saturated vapor in the upper part thereof. Some boilers are provided with two drums: a vapor drum (upper drum) and a water drum (lower drum), between which a heat exchanger (i.e. boiler bank tubes) is located.
- Other standard boiler parts and equipment, e.g. a combustion air system, a flue gas system, a feeding system for black liquor to be burned, a treatment system for melt and liquor, feed water pumps, etc.

In a conventional recovery boiler for waste liquor schematically illustrated in FIG. 1, in which there is a vertical flow boiler bank 5, the flue gases flow vertically downwardly from above. Adjacent to the boiler bank there is a passage 8, in which flue gases that have passed through the boiler bank 5 flow upwardly. Typically, the passage 8 is not provided with heat exchangers. Adjacent to the passage 8 there is a first economizer (a "hotter economizer") 6a. In the hotter economizer 6a the flue gases flow downwardly from above, transferring heat to the feed water flowing in the heat exchange elements thereof. Correspondingly, adjacent to the hotter economizer 6a there is a second flue gas passage 9, in which the flue gases from the lower part of the economizer 6a flow upwardly. The passage 9 is also, as conventional, an empty passage, containing neither heat exchange elements for heat recovery nor water pre-heaters. Adjacent to the flue gas passage 9 there is a second economizer (a "colder economizer") 6b, in which the flue gases flow downwardly from above, heating the feed water flowing in heat exchange elements thereof.

In addition to the boiler bank 5, two economizers 6a, 6b and the passages 8, 9 between them, the boiler may be provided with other corresponding flue gas passages and economizers.

Heat exchangers for heat recovery, i.e. the boiler bank 5 and the economizers 6a, 6b, are usually constructed in such a way that the flue gas does not flow upwardly from below, but in general flows merely downwardly from above. In some arrangements, in particular in older recovery boilers, the flue gases have been directed by baffles to partly or totally deviate from a vertical flow path, but in these instances the flow of the flue gases is also, in general, substantially downwardly from above.

In some recovery boilers the boiler bank is constructed in such a way that the flue gases flow substantially horizontally. In single-drum boilers provided with a horizontal flow boiler bank, the heat exchange elements of the boiler bank are typically positioned in such a way that the water to be boiled will flow substantially upwardly from below. The boiler bank is called a "horizontal boiler bank" since the flue gases flow substantially horizontally. Double-drum boilers are typically provided with an upper drum and a lower drum, the boiler bank tubes being positioned between them in such a way that the water to be boiled will flow in the tubes substantially upwardly from below, the flue gases flowing substantially horizontally. In this case the term "cross-flow" is used to describe the flue gas and water flows, and the term "cross-flow boiler bank" for the boiler bank.

In economizers the direction of flow of the water is usually reverse to the direction of flow of the flue gases in order to achieve desirable heat recovery. An economizer may also be of a cross-flow type, for example constructed in such a way that the water in the heat exchange elements of the economizer will flow substantially horizontally.

The flue gases are, as known, made to flow downwardly from above in the boiler bank and economizers. The ash passing along with the flue gases tends to foul heat exchange surfaces. Ash particles stick to the heat exchange surfaces, and the ash deposit gradually grows thicker, which lessens heat exchange efficiency. If a great deal of ash accumulates on the surfaces, the resistance to the flow of the flue gas may grow disturbingly great.

Heat exchange surfaces are cleaned by means of steam sootblowers through which steam is from time to time blown to the heat exchange surfaces. The ash accumulated on the surfaces is loosened and passes along with the flue gases into ash hoppers at the lower part of the heat exchange surface.

During the past few years, the dry solids content of the waste liquor to be burnt has been successfully raised to a level much higher than previously practical. The dry solids content of the waste liquor to be burnt was previously between about 58–68%, while in modern recovery boilers it is as a rule more than 68%, usually between about 70–80%, and in some plants even more than about 80% (e.g. about 80–90%). When burning waste liquor having a high dry solids content, the sulphur dioxide concentration has dropped to nearly zero, whereas in boilers burning liquor having a low dry solids content, it has been significantly higher, often hundreds of ppm.

It is well known that a recovery boiler is the most expensive individual piece of equipment investment for a chemical pulp mill. Therefore, boilers have to be subjected to continuous development so that they can be constructed at lower cost. Also, the structure of a boiler has to be developed in such a way that those properties (e.g. the raised dry solids content) of strong black liquor that have changed from what they used to be, are taken into account.

THE INVENTION

The invention provides a boiler construction that is simpler than known constructions. The construction of the invention has characteristics that make it suitable for burning black liquor with a dry solids content (i.e. consistency) of over 68%, even over about 80%.

The invention also provides an economizer system for preheating the feed water in the boiler that requires less space than previous pre-heating systems.

It is a characteristic of the apparatus according to the present invention that economizers for feed water are provided that are connected in series and positioned substantially adjacent to each other in such a way that there are no separate flue gas passages between them.

It is a characteristic of the method according to the present invention that the flue gases are made to flow through economizers connected in series and positioned substantially adjacent to each other, the direction of gas flow being in the reverse directions in two economizers positioned one immediately after the other in the path of gas movement.

Properties of the ash that passes along with the flue gases when burning waste liquor with high dry solids content are exploited according to the invention. Ash will no longer stick to the heat exchange surfaces as easily as previously. Also, new processes which improve the burning properties of waste liquor have been developed, so that the tendency of the ash to stick to the heat exchange surfaces has been successfully diminished. One such process is the Liquor Heat Treatment (LHT) process. Using the LHT process it is possible to reduce the viscosity of the liquor and also to remove some compounds, e.g. sulphuric compounds, as disclosed in U.S. Pat. Nos. 4,929,307 and 5,277,759 (the disclosures of which are incorporated by reference herein).

The designation "economizer" as used in the present specification and claims is only to denote heat exchange units used for heat transfer, and the scope of the invention is not to be limited by the use of this term to any particular design of a gas-to-liquid heat exchanger. An "economizer" is any heat exchanger (or plurality or grouping of heat exchangers) comprising heat exchange elements in which feed water to be heated flows inside the elements. Between the heat exchange elements of an economizer there is space for flowing flue gas. As the flue gas flows past the heat exchange elements, heat is transferred into the feed water flowing inside the elements.

A "boiler bank" as that term is used herein, is also formed by heat exchange elements in which water to be boiled, or a mixture of water and steam, flows inside the elements and into which heat is transferred from the flue gas flowing past the elements.

According to the invention, the economizers, or the boiler bank and the economizers, are positioned substantially adjacent to each other. "Substantially adjacent to each other" means that each subsequent economizer (being the latter in the path of movement of the flue gas, i.e. a colder economizer) is positioned immediately adjacent to the preceding economizer (i.e. a hotter economizer) in such a way that the upper end of the heat exchange elements of the latter economizer is at substantially the same level as the upper end of the heat exchange elements of the preceding economizer or boiler bank, or at least being no lower or higher relative to the upper end of the heat exchange elements of the preceding economizer or boiler bank than less than about one third (⅓) the total length of the preceding economizer or boiler bank.

According to one aspect of the present invention a recovery boiler is provided comprising the following components: A furnace for burning waste liquor to produce flue gases, and including an upper portion through which flue gases flow. At least first and second economizers for preheating feed water flowing therethrough by bringing the feed water into heat exchange relationship with the flue gases, the economizers downstream (in the path of flue gas flow) of the upper portion of the furnace and positioned in heat exchange relationship with the flue gases. And, wherein the economizers are positioned substantially adjacent each other and connected in such a way that flue gas leaving the first economizer passes substantially directly (i.e. without going through a conventional accessory passage) into the second economizer.

Each of the economizers has an inlet and an outlet for flue gases. Preferably the first economizer outlet and second economizer inlet are connected together by a reverse turn so that flue gas flowing through the first economizer in a first direction is directed to flow through the second economizer in a second direction substantially opposite the first direction. There also may be a third (or more) economizer having an inlet and an outlet, with the third economizer inlet connected by a reverse turn to the second economizer outlet so that the flue gas leaving the second economizer passes substantially directly into the third economizer inlet. The first economizer outlet is at substantially the same level as the second economizer inlet, or at least the first economizer outlet is vertically spaced less than about one-third the length of the first economizer from the second economizer inlet. The same relationship holds true between the second and third economizers.

The first economizer inlet may be vertically below the first economizer outlet so that flue gases flow substantially upwardly through the first economizer, or positioned vice-versa (that is so that the flue gases flow substantially downwardly through the first economizer). A boiler bank is typically provided connected between the superheater of the recovery boiler and the first economizer, although the first economizer may be disposed immediately adjacent the superheater zone adjacent the upper portion of the furnace, with no intervening boiler bank (in this situation the flue gas typically flows substantially downwardly through the first economizer).

According to another aspect of the present invention a method of operating a recovery boiler having a furnace with an upper portion in which flue gases flow, and at least first and second economizers, is provided. The method comprises the following steps: (a) Burning cellulose pulp production waste liquor (typically black liquor) in the recovery boiler furnace so that flue gases are generated and flow upwardly to the upper portion of the furnace. (b) Causing the flue gases to flow from the upper portion of the furnace into the first economizer, cooling the flue gases in the first economizer, and causing the cooled gases to exit the first economizer. And, (c) passing flue gases from the first economizer substantially directly to the second economizer, without causing it to flow through an accessory passage, cooling the flue gases in the second economizer, and causing the cooled gases to exit the second economizer.

Step (b) is typically practiced to cause the flue gas to flow in a first substantially vertical direction and step (c) to cause the flue gas to flow in a second substantially vertical direction substantially opposite the first direction. The first direction may be substantially upwardly and the second direction substantially downwardly, or viceversa.

Step (a) is typically practiced by introducing black liquor having a consistency of over about 70% into the furnace and burning the black liquor. Step (a) is also typically further practiced by introducing black liquor having a dry solids concentration of at most about 3% potassium, and at most about 1% chlorine.

There typically is the further step (d), before step (b), of passing the flue gases through a boiler bank and cooling the flue gases in the boiler bank. A third economizer (or more) may also be utilized in which case there is the further step (e) of passing flue gases from the second economizer substantially directly to the third economizer, without causing it to flow through an accessory passage, cooling the flue gases in the third economizer, and causing the cooled gases to exit the third economizer.

Water circulates in the economizers, and there typically is the further step of causing the water circulating in each of the economizers to flow in a direction substantially opposite the direction of flow of flue gases through each respective economizer.

It is the primary object of the present invention to provide an advantageous method and apparatus for transferring heat from flue gases to circulating water in recovery boiler economizers or the like. This and other objects of the invention will become clear from an inspection of the detailed description of the invention and from the appended claims.

DETAILED DESCRIPTION OF THE DRAWINGS

Figure 1:
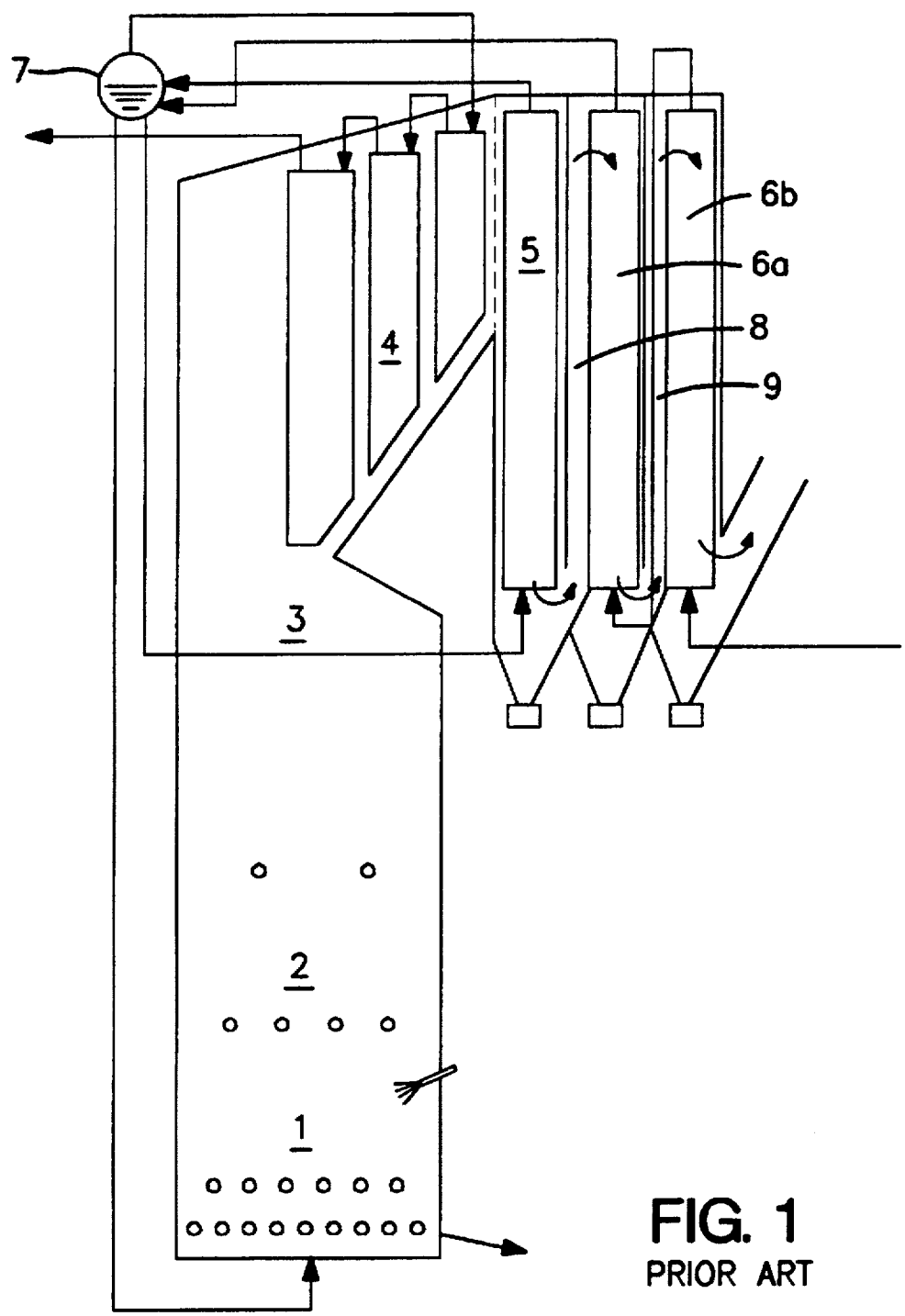
FIG. 1 is a schematic side view of an exemplary prior art recovery boiler with economizers.
Figure 2:
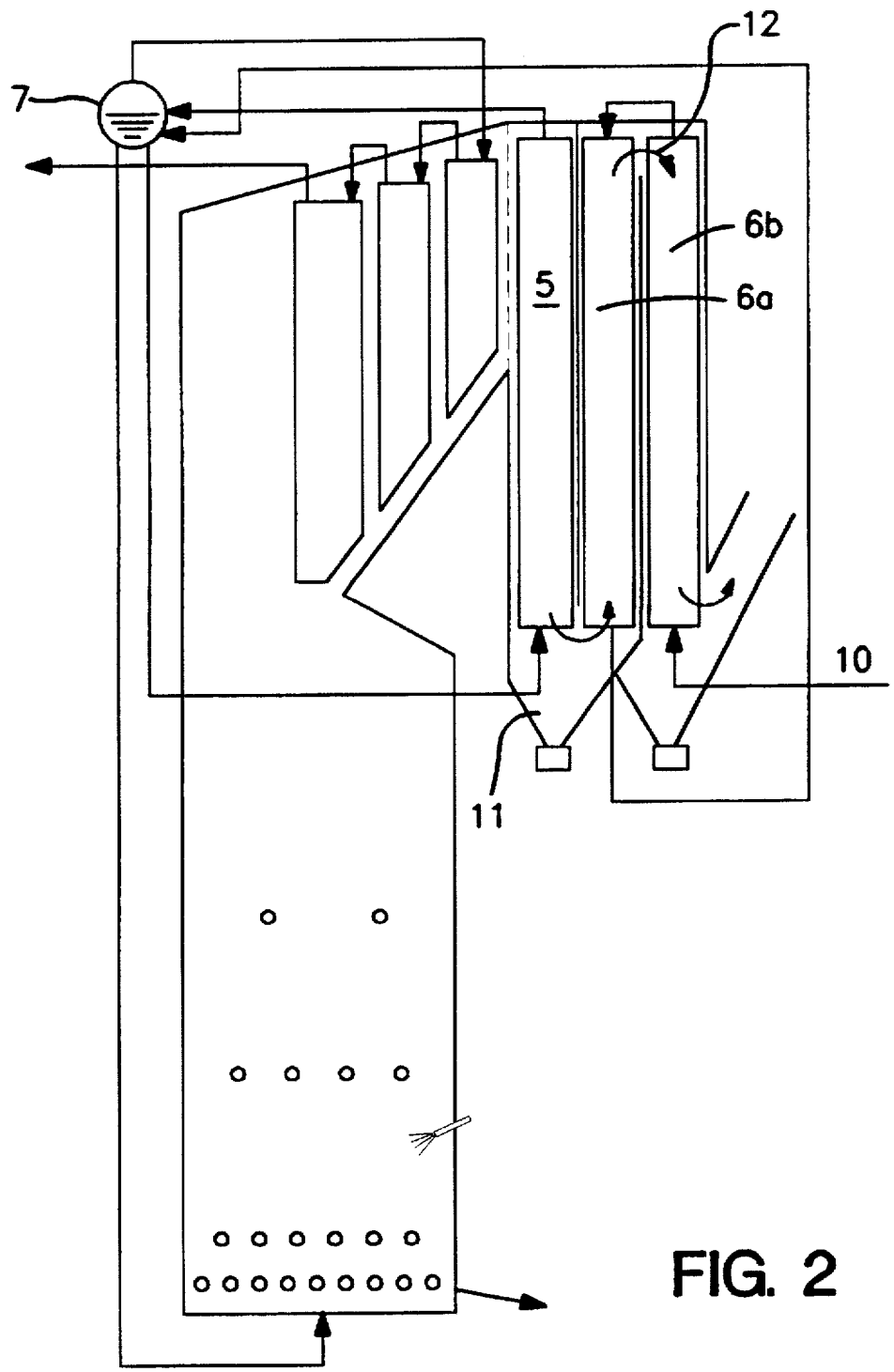
FIG. 2 is a schematic side view of an exemplary apparatus according to the present invention in which a conventional recovery boiler is provided with a vertical flow boiler bank, i.e. in which the flue gases flow through a boiler bank vertically, downwardly from above.

FIG. 2 illustrates a recovery boiler in which a hotter vertical economizer 6a in accordance with the invention is positioned adjacent to a vertical flow boiler bank 5 in such a way that after coming out of the boiler bank 5, the flue gases may flow substantially directly to the hotter economizer 6a, in which they preferably flow upwardly from below. At the turning point (reverse turn) of the flue gases in the lower part of the boiler bank 5 there is a conventional ash hopper 11, into which part of the fly ash accumulates for further use. The feed water to be heated preferably flows in the economizer 6a in a direction counter-current to the flue gas flow, however according to the present invention the feed water may alternatively flow cocurrently to the flow direction of the flue gases. Adjacent to the hotter economizer 6a, a colder vertical economizer 6b is positioned in such a way that between the economizers 6a 6b, there is no separate empty flue gas passage (such as the passage 8 in FIG. 1).

After flowing through the hotter economizer 6a to the upper part thereof, the flue gases flow substantially directly to the next (colder) economizer 6b, in which they preferably flow downwardly from above as indicated by arrow 12 in FIG. 2. In the colder economizer 6b the feed water to be heated preferably flows through a tube 10 counter-currently to the flow direction of the flue gases.

Figure 3:
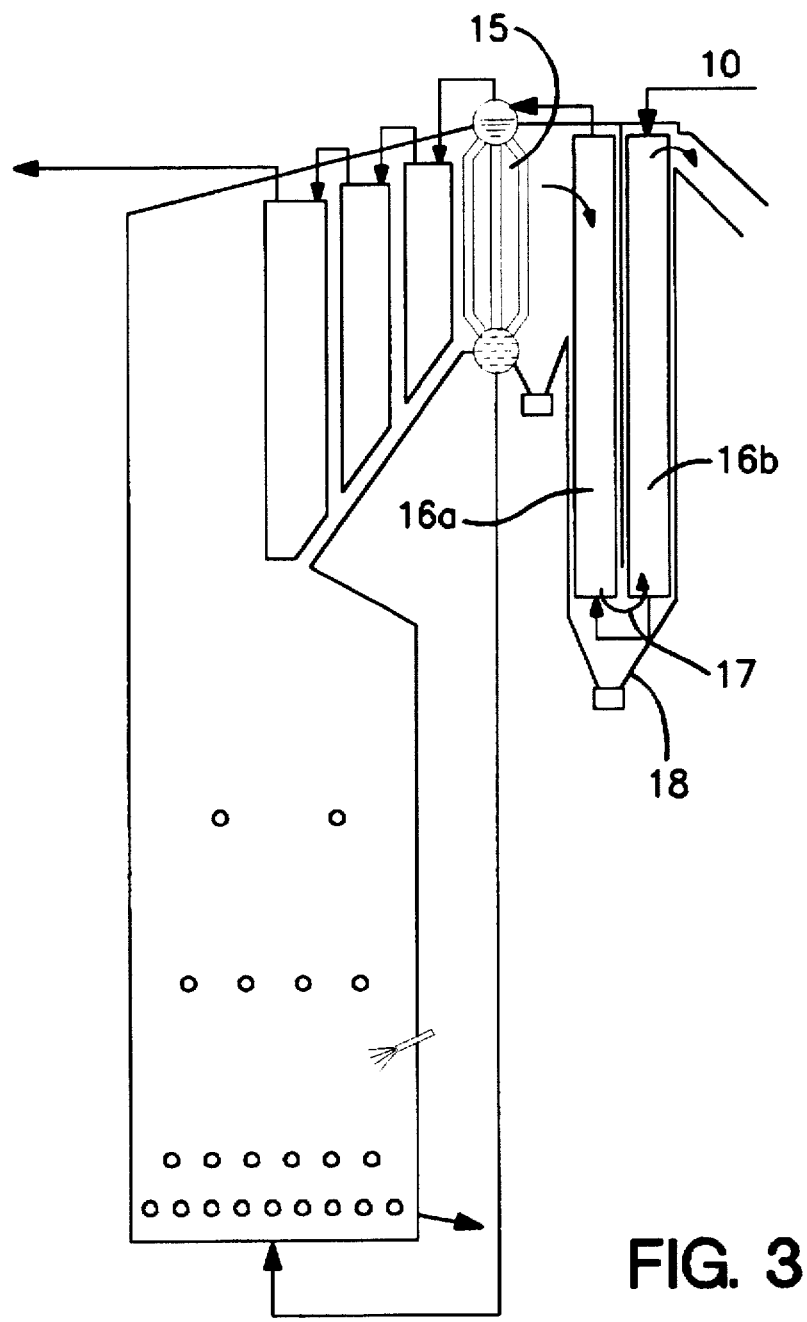
FIG. 3 is a schematic side view of an exemplary apparatus according to the present invention in which a conventional double-drum boiler is provided with two economizers.
Figure 4:
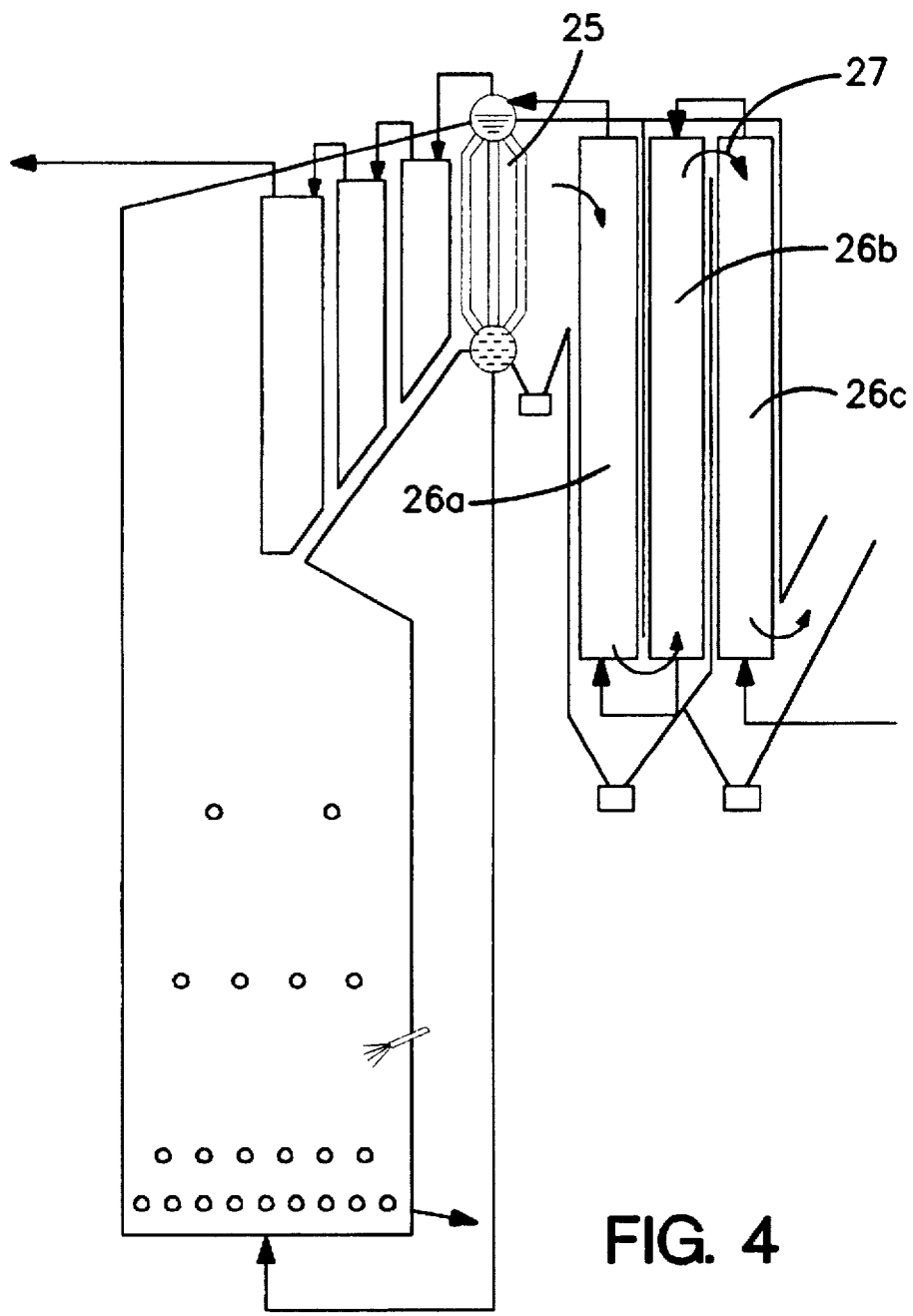
FIG. 4 is a schematic side view of an exemplary apparatus according to the present invention in which a double drum boiler is provided with three economizers.

FIG. 3 schematically illustrates how, in accordance with an alternative construction according to the invention, a boiler bank 15 is constructed in such a way that the flue gases flow substantially horizontally therethrough. This is effected, for example, for boilers provided with two drums and a boiler bank tube system between the drums. Also in single-drum boilers, a boiler bank is sometimes used in which the flue gases flow horizontally. In such a construction the flue gases, having passed through the boiler bank 15, flow (as is conventional) directly to the upper part of a hotter economizer 16a. In economizer 16a the flue gases flow downwardly from above. The present invention can be utilized here in such a way that after the hotter economizer 16a, the flue gases flow substantially directly to a colder economizer 16b, in which they flow upwardly from below, as indicated by arrow 17 in FIG. 3. At the turning point of the flue gases below the hotter economizer 16a there is a conventional ash hopper 18. If the boiler is provided with a third economizer (such as 26c, as is schematically illustrated in FIG. 4), the flue gases flow downwardly from above therein (as indicated by arrow 27 in FIG. 4), so that again there are no empty passages for the flow of flue gases between the various economizers.

According to the invention the construction details of the heat exchange surfaces of a recovery boiler for waste liquor, and the number thereof, may be different from what is described above. For example, there may be more than two economizers, such as the three economizers 26a, 26b, 26c of FIG. 4 (also shown with a boiler bank 25), or even more.

The present invention is also applicable to boilers with no separate boiler bank after the superheating zone (4). In this case, the flue gases flow directly to a hotter economizer after the superheating zone (4), and therefrom further to the following economizers.

The present invention is especially applicable to those instances where the dry solids content of the waste liquor to be burnt is over about 70%, typically between about 70–90%, or where the waste liquor does not contain significant amounts of components having a tendency to foul heat exchange surfaces. The invention is especially suitable for such cases where the dry solids of the waste liquor contain at most about three per cent potassium and at most about one per cent chlorine; however, the applicability of the invention is not necessarily limited to these properties of waste liquor.

Advantages achieved by the invention from the elimination of empty flowing passages for flue gas are a significant reduction in the total cost of the recovery boiler, and a reduction in the volume of space taken up thereby.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A recovery boiler comprising:

a furnace for burning waste liquor to produce flue gases, and including an upper portion through which flue gases flow;

at least first and second economizers for preheating feed water flowing thereto by bringing the feed water into heat exchange relationship with the flue gases, said economizers downstream, in a path of flue gas movement, of said upper portion of said furnace and positioned in heat exchange relationship with the flue gases;

wherein said economizers are positioned substantially adjacent each other and connected in such a way that flue gas leaving said first economizer passes substantially directly into said second economizer;

wherein each of said economizers has an inlet and an outlet for flue gases; and wherein said first economizer outlet and second economizer inlet are connected together by a reverse turn so that flue gas flowing through said first economizer in a first direction is directed to flow through said second economizer in a second direction substantially opposite said first direction.

2. A recovery boiler as recited in claim 1 further comprising a third economizer having an inlet and an outlet, said third economizer inlet connected by a reverse turn to said second economizer outlet so that flue gas leaving said second economizer passes substantially directly into said third economizer inlet.

3. A recovery boiler as recited in claim 1 wherein said first economizer outlet is at substantially the same level as said second economizer inlet.

4. A recovery boiler as recited in claim 1 wherein said economizers each have a length, and wherein said first economizer outlet is vertically spaced less than about one third the length of said first economizer from said second economizer inlet.

5. A recovery boiler as recited in claim 2 wherein said economizers each have a length, and wherein said first economizer outlet is vertically spaced less than about one third the length of said first economizer from said second economizer inlet, and said second economizer outlet is vertically spaced less than about one third of the length of said second economizer from said third economizer inlet.

6. A recovery boiler as recited in claim 1 wherein said first economizer inlet is vertically below said first economizer outlet so that flue gases flow substantially upwardly through said first economizer.

7. A recovery boiler as recited in claim 5 further comprising a boiler bank connected between said furnace and said first economizer.

8. A recovery boiler as recited in claim 3 wherein said first economizer outlet is vertically below said first economizer inlet so that flue gases flow substantially downwardly through said first economizer.

9. A recovery boiler as recited in claim 7 further comprising a boiler bank connected between said furnace and said first economizer.

10. A recovery boiler as recited in claim 7 further comprising a superheater zone adjacent said upper portion of said furnace; and wherein said first economizer is disposed immediately adjacent said superheater zone, with no intervening boiler bank.

11. A method of operating a recovery boiler having a furnace with an upper portion in which flue gases flow, and at least first and second economizers, said method comprising the steps of:

(a) burning cellulose pulp production waste liquor in the recovery boiler furnace so that flue gases are generated and flow upwardly to the upper portion of the furnace;

(b) causing the flue gases to flow from the upper portion of the furnace into the first economizer, cooling the flue gases in the first economizer, and causing the cooled gases to exit the first economizer; and (c) passing flue gases from the first economizer substantially directly to the second economizer, without causing it to flow through an accessory passage, cooling the flue gases in the second economizer, and causing the cooled gases to exit the second economizer.

12. A method as recited in claim 10 wherein step (b) is practiced to cause the flue gases to flow in a first substantially vertical direction, and step (c) to cause the flue gases to flow in a second substantially vertical direction substantially opposite the first direction.

13. A method as recited in claim 11 wherein the first direction is substantially upwardly and the second direction substantially downwardly.

14. A method as recited in claim 11 wherein the first direction is substantially downwardly and the second direction substantially upwardly.

15. A method as recited in claim 10 wherein step (a) is practiced by introducing black liquor having a consistency of over about 70% into the furnace and burning the black liquor.

16. A method as recited in claim 14 wherein step (a) is further practiced by introducing black liquor having a dry solids concentration of at most about 3% potassium and at most about 1% chlorine.

17. A method as recited in claim 10 comprising the further step (d), before step (b), of passing the flue gases through a boiler bank, and cooling the flue gases in the boiler bank.

18. A method as recited in claim 16, utilizing a third economizer, and comprising the further step (e) of passing flue gases from the second economizer substantially directly to the third economizer, without causing it to flow through an accessory passage, cooling the flue gases in the third economizer, and causing the cooled gases to exit the third economizer.

19. A method as recited in claim 10 wherein water circulates in the economizers, and comprising the further step (d) of causing the water circulating in each of the economizers to flow in a direction substantially opposite the direction of flow of flue gases through each respective economizer.

* * * * *